Jan. 10, 1956 E. E. BOWER 2,730,217
POWER TRANSMITTING MECHANISM
Filed Oct. 7, 1952 2 Sheets-Sheet 2
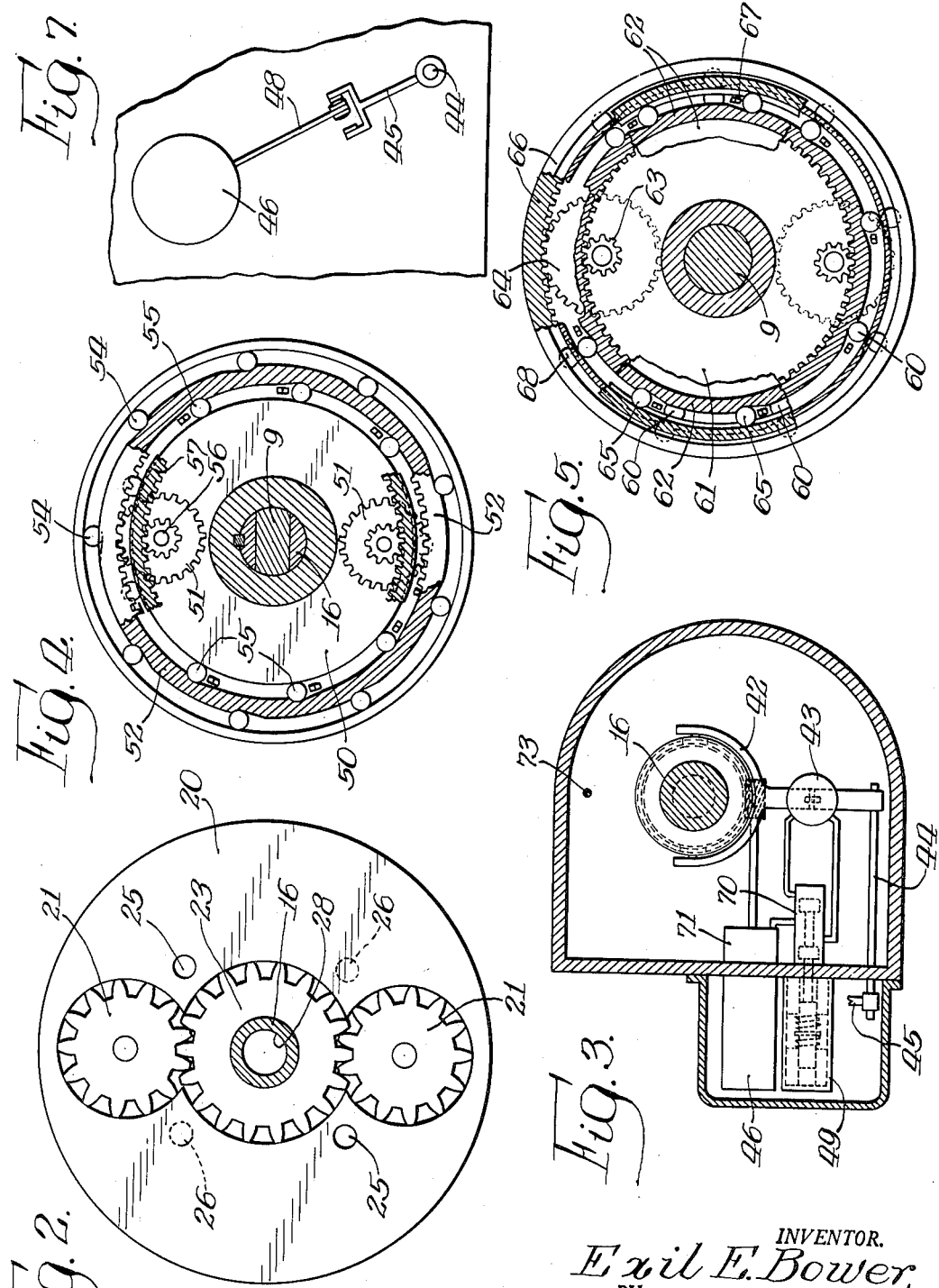
INVENTOR.
Exil E. Bower,
BY Schroeder, Merriam,
Hofgren & Brady. Att'ys United States Patent Office 2,730,217
Patented Jan. 10, 1956

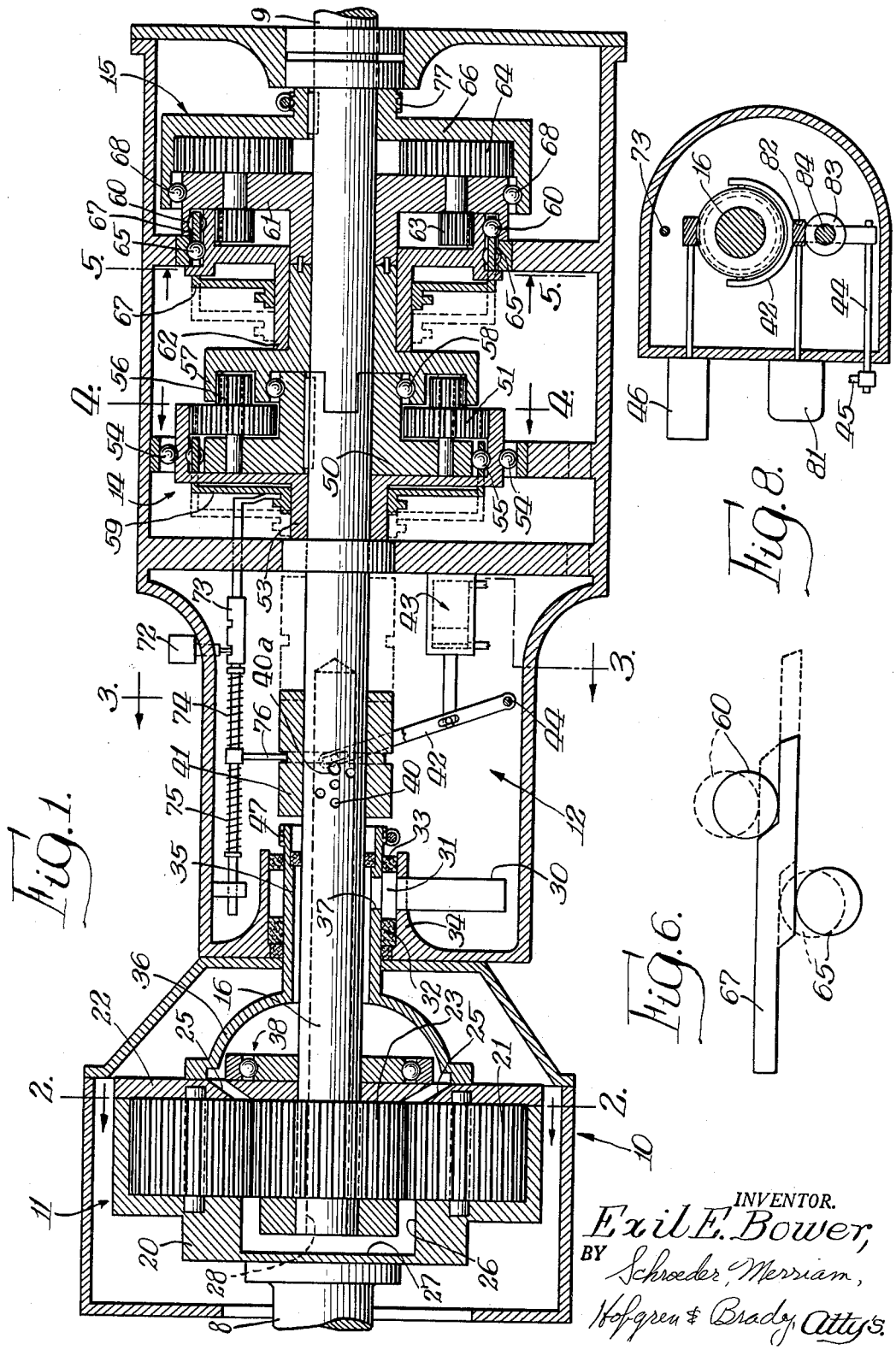

2,730,217
POWER TRANSMITTING MECHANISM
Exil E. Bower, Charleston, Ill.
Application October 7, 1952, Serial No. 313,550
4 Claims. (Cl. 192—61)

This invention relates to a power transmitting mechanism and particularly to a mechanism for transmitting torque from a drive shaft to a driven shaft.

The application of the present mechanism is particularly suited for use with power plants which are not self-starting and which have an absolute maximum torque not much greater than their normal full-load torque. Thus excluded are such power plants as steam and electric motors which are usually positively geared or direct-connected to the mechanisms which they drive. Primarily, the present invention is designed for use with internal combustion engines as may be used in automobiles, light trucks, tractors and any other application of internal combustion engine power. The unit is capable of permitting the power plant to apply greater torque for the purposes of negotiating grades and for acceleration.

A number of power transmitting mechanisms are in general use and eliminate the necessity of manual shifting of gear ratios in moving the driven shaft from a standstill to high speed. These same mechanisms have consisted ordinarily of a considerable number of parts and an even greater and more complicated arrangement of control parts. There has not been provided a simple mechanism for use in the lighter automobiles and trucks, especially one of low cost and simple maintenance.

The present invention provides a power transmitting mechanism having a comparatively small number of parts. The controls for the system are simple and the mechanism is capable of adapting itself to a number of different kinds of controls. The mechanism is particularly a combination of improved individual mechanisms including a fluid clutch and a constant mesh gear transmission capable of giving variable gear ratios in both forward and reverse direction. Smoothness of operation and variation in the application of engine torque is provided in the fluid clutch and its controls.

A particular embodiment of the invention is illustrated in the accompanying drawings, in which:

Figure 1 is a diagrammatic vertical sectional view through the mechanism taken substantially through the centers of the drive and driven shafts;

Figure 2 is a diagrammatic sectional view of the fluid clutch oil pump members taken substantially along line 2—2 in Figure 1;

Figure 3 is a fragmentary diagrammatic sectional view of the clutch control mechanism taken substantially along line 3—3 in Figure 1;

Figure 4 is a diagrammatic broken sectional view through the variable speed drive taken substantially along line 4—4 in Figure 1;

Figure 5 is a diagrammatic broken sectional view through the reverse drive taken substantially along line 5—5 in Figure 1;

Figure 6 is a fragmentary enlarged diagrammatic view of the shifting finger used with the reverse drive;

Figure 7 is a diagrammatic broken side view of the mechanism showing a part of the clutch control; and Figure 8 is like Figure 3 showing electric motor control for the clutch.

The mechanism itself consists primarily of two parts each having two major portions. In Figure 1 the drive shaft 8 is at the left-hand side of the figure and the driven shaft 9 is at the right-hand side. Immediately adjacent the drive shaft 8 is clutch portion 10 including driving mechanism 11 and an oil reservoir 12 separate from the compartment containing the driving mechanism 11. The transmission includes a variable speed driving unit 14 and a reverse driving unit 15. Both driving units are of constant mesh gear type. The reverse drive is connected to the driven shaft 9 and the power train is through the drive shaft 8, the clutch mechanism to a clutch shaft 16, through the variable speed drive, and then through the reverse gear to the driven shaft.

It is believed that the clearest understanding of the mechanism will be obtained from a description of the several parts individually, both as to their structure and their moving parts. The clutch mechanism includes the flywheel 20 which is secured to the drive shaft 8. The flywheel is hollow in part so as to accommodate a pair of pinions 21 which are carried adjacent the periphery of the wheel. A cover plate 22 provides an anchor for the shafts of the pinions. Centrally disposed between the pinions is a central gear 23 splined or otherwise fastened to clutch shaft 16. Gear 23 meshes with each pinion gear 21 and forms therewith a positive displacement oil pump. The inlets 25 to the pumps are on the forward side of the flywheel and the outlets 26 are passages formed within the flywheel and are connected by a cross passage 27 leading to the bore 28 formed in the center of clutch shaft 24.

The oil reservoir 12 is purposely made separate from the compartment in which the flywheel 20 revolves. Oil may be conducted to the inlets of the pumps by means of inlet tube 30 which communicates with an annular space 31 formed between two seals 32 and 33 between a boss 34 and casing 35. The end of the casing 35 adjacent the flywheel is flared as indicated by portion 36 and the whole casing is secured to the flywheel so that it rotates therewith. An opening 37 is provided in the casing opposite the annular space 31 so that oil may be conducted between the casing 35 and clutch shaft 24 and upon reaching the flared portion, will be thrown outwardly to the inlets 25 to the oil pumps. This will maintain approximately the same amount of oil in the pumps and flywheel at all times so that the weight of the flywheel will be substantially constant. Ordinarily the open end of the inlet tube 30 is placed well below the normal oil level so that air and foam will not be permitted in the inlet oil passage.

The clutch shaft 24 is restrained from overrunning the flywheel by a one-way clutch 38 mounted entirely within the flared portion of the casing 35 so as to be adequately lubricated. This clutch is also one of three overrunning clutches in the system which permit engine drag to act as a brake.

Power may be transmitted from the drive shaft to the clutch shaft by stopping the flow of oil in the outlet passage from the pumps. When pressure in the outlet passage has been increased to a sufficient value, the gears will stop turning and will therefore carry the center gear 23 along with the pinions without substantial relative rotation between them. When this occurs, the clutch shaft 16 will have the same angular velocity as the drive shaft. The outlet from the return passage 28 to the oil reservoir 12 is by means of a number of drilled openings 40 through the side wall of the clutch shaft 16. Opening 40a remote from the flywheel 20 is relatively large to permit free flow when no torque is transmitted to shaft 16. These openings are staggered longitudinally of the shaft and may be progressively opened and closed by a sleeve type member 41. This valve member may be moved by any desired mechanism and for purposes of exemplary disclosure a yoke 42 operated by a piston and cylinder device 43 is herein shown for opening and closing the oil outlet passage. This valve may be automatically controlled if desired and an exemplary control will be hereinafter described.

Assuming the clutch engaged in such a manner that the clutch shaft rotates with the drive shaft, a forward drive of the driven shaft 9 may be accomplished through the gear transmission. The variable speed drive includes a planet carrier 50 keyed to the clutch shaft and carrying compound planet gears 51. The gears are in mesh respectively with a ring gear 52, which is idly mounted by bearing portion 53 on the clutch shaft and ring gear 57. The larger portion of the compound planets mesh with ring gear 52. A one-way brake 54 prevents the ring gear 52 from rotating in a direction opposite to that of the planet carrier. A one-way clutch 55 is positioned between the planet carrier and ring gear and may be selectively disengaged to separate the members or when left free will hold the parts together.

The drive is accomplished by the smaller portion 56 of the compound gears in mesh with ring gear 57. Low gear is accomplished when the ring gear 52 is not secured to the carrier so that it remains still. In this position the ring gear 57 will be caused to rotate in the same direction as the planet carrier but at slower velocity. One-way clutch 58 is provided to prevent ring gear 57 from overrunning the planet carrier.

During forward motion the reverse gear drive is simply locked together as a unit, its only function being to transmit the rotary motion of ring gear 57 to the driven shaft 9. This locking is accomplished by one-way clutch 60 which locks planet carrier 61 to the idle ring gear 62 thereby preventing the small planet gear 63 from turning on its own axis as well as the larger planet gear 64 which is on the same shaft. To obtain a reverse drive, the one-way clutch 60 is locked out and one-way brake 65 maintains the idle ring gear 62 stationary while small pinion 63 runs over the ring gear, turning the larger pinion 65 at the same angular velocity and thus ring gear 66 will rotate oppositely in direction to the carrier 61. The two speeds of the variable speed drive 14 can be utilized with either forward or reverse drive 15. One-way clutch 68 is the third, along with 58 and 38, which prevents the driven shaft from overrunning the drive shaft and allows the engine to be used as a brake.

As seen in Figure 6, fingers 67 may be moved to lock in inoperative position, both the one-way clutch 60 and brake 65. The fingers are operated manually by a manual control lever and will ordinarily lock out both of the one-way devices just mentioned during engine starting or testing.

The automatic control for the clutch mechanism has been shown in part above, in that the shifting fork 42 and piston and cylinder 43 move the valve 41 between its limiting positions. This fork is mounted on a shaft 44 which also carries contact points on an arm 45 outside of the oil chamber. A governor member 46 is driven through a gear 47 on the casing 35 and swings an arm 48 in response to the speed at which the flywheel is driven. This arm makes contact with the contact points for the purpose of energizing a solenoid 49 which controls the piston and cylinder device 43 by means of a two-way valve 70 inside the oil compartment. An oil pump 71 supplies oil from the sump 12 to one side of the piston cylinder 43 depending upon the position of the valve 70. While the instant control is supplied by an oil pump 71, it is perfectly obvious that a reversible electric motor and suitable gearing could be substituted or that the solenoid 49 can be used without the piston and cylinder for moving the shifting fork. In Figure 8 is shown an electrical control with a reversible motor 81 for driving worm 82 and thus worm wheel 83 on screw shaft 84 to move the shifting fork 42. The control contact point arrangement shown in Figure 7 dictates whether the motor advances or retracts valve 41.

In operation, the control gradually opens or closes the valve in accordance to the speed of the drive shaft 8. Contacts between arms 48 and 45 are intermittently made and broken to affect the moving of the sleeve valve 41. Control of valve 41 may be regulated to open and close with relation to the speed of the driven shaft or of the machine so driven. In an automobile, control valve 41 reaches completely closed position at a road speed of 14 M. P. H. when unit 14 is in the higher ratio and at 6 M. P. H. when unit 14 is in the lower ratio.

In order to insure that the variable speed drive 14 is shifted only when no substantial load is being applied, a solenoid 72 controls the shifting member 73 and the fingers 59 which shift the forward drive unit between its speeds as earlier described. The solenoid is energized (as by a switch associated with an accelerator, not shown) only when the power plant is not supplied with its source of fuel such as when letting up on the accelerator so that compression springs 74 or 75 compressed by a valve follower 76 will actually do the shifting.

The shifting from forward to reverse directions by shifting lever 67 will only be permitted when the sliding valve 41 is in open position. A suitable electrical control can be provided to affect this locking arrangement. Various appurtenances could be used in connection with the mechanism such as for example, a speedometer cable may be connected and driven by a gear 77 secured to ring gear 66 on the driven shaft 9.

The embodiment shown and described includes a single 2-speed unit 14 whereas particular applications may require additional variation in gear ratios. It is only necessary to add more 2-speed units 14 on either side of the one shown or on either side of the reverse unit 15 to provide more gear ratios.

The whole mechanism is contained in a suitable casing with proper bearings and seals. Since the oil compartment is separate from the flywheel compartment, only ordinary type seals are required. The transmission case may be filled to a proper level with lubricant so that all parts are adequately lubricated during use.

The foregoing detailed description has been given for clearness of understanding only, and no unnecessary limitations should be understood therefrom, for some modifications will be obvious to those skilled in the art.

I claim:

1. A power transmitting mechanism, comprising: a drive shaft adapted to be coupled to a source of torque; a driven shaft adapted to supply torque for use and adapted to have a constant mesh gear transmission for transmitting the drive torque to the driven shaft and a fluid clutch mechanism between the drive shaft and gear transmission; said clutch mechanism including a flywheel on the drive shaft having therein a plurality of pinions arranged about the axis of the drive shaft, a clutch shaft carrying a central gear reposing in said flywheel and in mesh with said pinions to form a plurality of gear type oil pumps having inlets and outlets on opposite sides of the flywheel, an oil reservoir compartment separate from the oil pumps and flywheel, an oil conducting casing on the flywheel surrounding the clutch shaft and extending from the flywheel into the oil supply compartment, said casing flaring outwardly adjacent the oil inlets to said pumps whereby centrifugal force aids in conducting the oil to the pump inlets, means for conducting oil into said casing, said clutch shaft having a bore communicating with the outlets from said pumps and the oil supply compartment, and a valve for closing said bore against the passage of oil whereby said pump gears may couple the clutch shaft to the drive shaft.

2. In a power transmitting mechanism, comprising: a drive shaft and a separate driven shaft; selectively engageable means for connecting the drive and driven shafts including a gear transmission and a fluid clutch mechanism, said clutch mechanism having a flywheel on the drive shaft with a gear type oil pump therein, said pump having an oil inlet and outlet spaced apart, a clutch shaft adapted to be driven by one member of the oil pump and to drive said gear transmission, an oil supply compartment separate from the flywheel with said clutch shaft extending into the compartment, a hollow casing about the clutch shaft forming an oil supply passage about the clutch shaft for carrying oil to the pump, said hollow casing having an outwardly flaring portion adjacent the inlet to the pump whereby rotation of the casing forces oil therein toward the pump inlet, an oil return passage within the clutch shaft and a valve member for closing the return passage to substantially stop relative rotation of the oil pump gears and couple the clutch shaft to the drive shaft.

3. In a power transmitting mechanism, comprising: a drive shaft and a separate driven shaft; selectively engageable means for connecting the drive and driven shafts including a gear transmission and a fluid clutch mechanism, said clutch mechanism having a flywheel on the drive shaft with a gear type oil pump therein, said pump having an oil inlet and outlet spaced apart, a clutch shaft adapted to be driven by one member of the oil pump and to drive said gear transmission, an oil supply compartment separate from the flywheel with said clutch shaft extending into the compartment, a hollow casing about the clutch shaft forming an oil supply passage about the clutch shaft for carrying oil to the pump, said casing being secured to the flywheel for rotation therewith, a pair of annular spaced seals in the oil supply compartment about the casing forming an annular oil supply chamber communicating with the supply passage, said passage being provided with a downwardly extending inlet tube having an opening substantially below normal oil level in the compartment, an oil return passage within the clutch shaft and a valve member for closing the return passage to substantially stop relative rotation of the oil pump gears and couple the clutch shaft to the drive shaft.

4. A power transmitting mechanism, comprising: a drive shaft; a driven shaft separate from the drive shaft; and selectively engageable means for connecting the drive and driven shafts, said means including a flywheel on the drive shaft having therein a plurality of gear pumps, a clutch shaft secured to at least one of the gears of said pumps, an oil supply compartment next to the flywheel but separate therefrom with inlet and return oil passages extending between the gear pumps and said compartment, said clutch shaft extending through the supply compartment, a valve member for closing said passage and coupling the drive and clutch shafts through the gears of said pumps, a one-way clutch between the drive shaft and the clutch shaft to prevent the driven shaft from overrunning the drive shaft, said one-way clutch being mounted in the inlet oil passage to the gear pumps, and a valve member actuating control responsive to angular velocity of the drive shaft for coupling and uncoupling the drive and clutch shafts and transmitting torque to the driven shaft.

References Cited in the file of this patent

UNITED STATES PATENTS

| | | |
|---|---|---|
| 1,132,746 | Sundh | Mar. 23, 1915 |
| 1,748,436 | Arkin | Feb. 25, 1930 |
| 1,764,961 | Kittilsen | June 17, 1930 |
| 1,883,685 | Gasterstadt | Oct. 18, 1932 |
| 1,990,067 | Finken | Feb. 5, 1935 |
| 2,037,787 | Hughes | Apr. 21, 1936 |
| 2,168,600 | Brown | Aug. 8, 1939 |
| 2,193,806 | De Vore | Mar. 19, 1940 |
| 2,371,229 | Dodge | Mar. 15, 1945 |
| 2,377,350 | Marsh | June 5, 1945 |
| 2,404,623 | Dodge | July 23, 1946 |
| 2,516,059 | Lamphere | July 18, 1950 |
| 2,564,848 | Jessup | Aug. 21, 1951 |
| 2,595,231 | Desmond | May 6, 1952 |
| 2,613,549 | Thurber | Oct. 14, 1952 |
| 2,625,840 | Sublette | Jan. 20, 1953 |
| 2,634,627 | Flynn | Apr. 19, 1953 |
| 2,665,595 | Moon | Jan. 12, 1954 |
| 2,688,256 | Forster | Sept. 7, 1954 |

FOREIGN PATENTS

| | | |
|---|---|---|
| 573,341 | France | June 21, 1924 |